No. 852,928. PATENTED MAY 7, 1907.
C. F. CLAWSON.
NUT LOCK FOR RAIL JOINT FASTENINGS.
APPLICATION FILED DEC. 26, 1906.
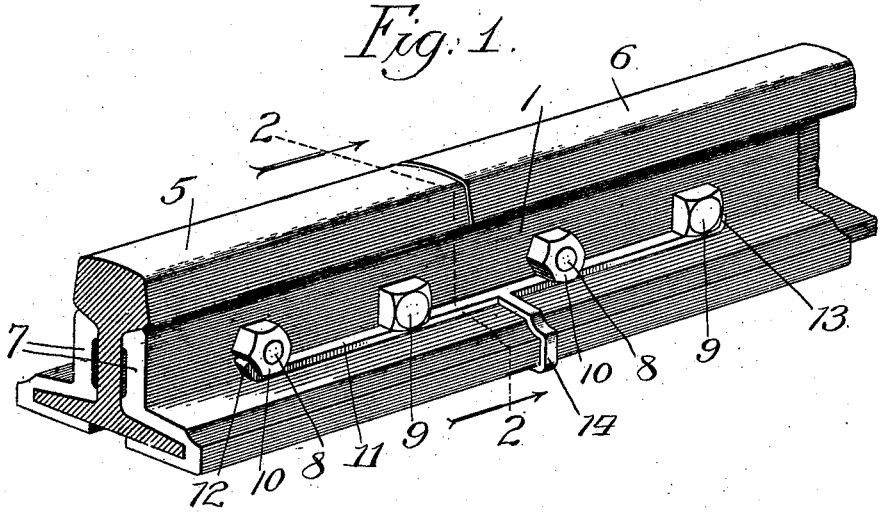
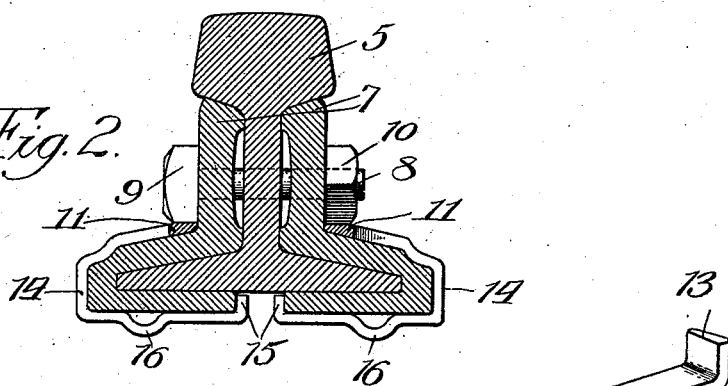
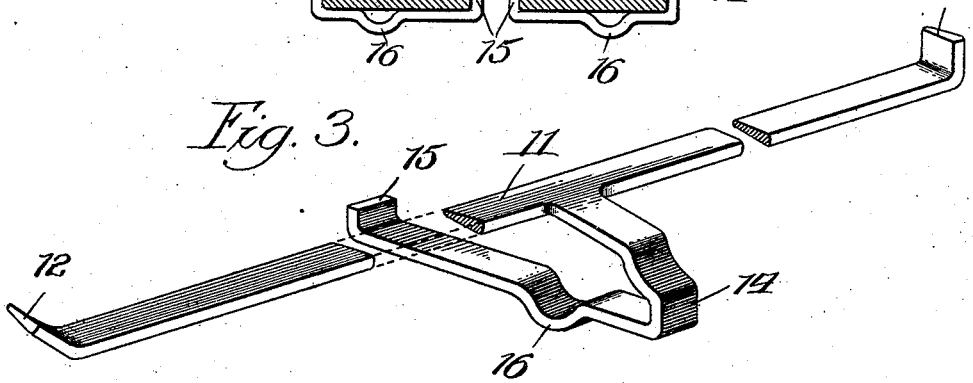
Witnesses:
Inventor:
Charles F. Clawson,
By Samuel N. Pond
Atty.

UNITED STATES PATENT OFFICE.

CHARLES F. CLAWSON, OF MOUNT PLEASANT, IOWA, ASSIGNOR OF ONE-FOURTH TO ADAM WEIR AND ONE-FOURTH TO JOHN T. CORCORAN, BOTH OF MOUNT PLEASANT, IOWA.

NUT-LOCK FOR RAIL-JOINT FASTENINGS.

No. 852,928.     Specification of Letters Patent.     Patented May 7, 1907.

Application filed December 26, 1906. Serial No. 349,373.

*To all whom it may concern:*

Be it known that I, CHARLES F. CLAWSON, a citizen of the United States, residing at Mount Pleasant, in the county of Henry and State of Iowa, have invented certain new and useful Improvements in Nut-Locks for Rail-Joint Fastenings, of which the following is a specification.

This invention relates to nut-locks, and has reference more particularly to a device for preventing the nuts of rail-joint fastenings from working loose.

The object of the invention is to provide a simple, economical and efficient device for the purpose specified capable of ready application to and removal from standard types of rail-joint fastenings, and involving, for its use, no modification or special construction of the latter.

The device of my invention will be readily understood when considered in connection with the accompanying drawing, showing an approved mechanical embodiment of the same, in which—

Figure 1 is a perspective view of a rail-joint and its fastenings equipped with my invention; Fig. 2 is a cross-sectional view, somewhat enlarged, on the line 2—2 of Fig. 1; and Fig. 3 is an enlarged perspective view, broken out intermediate its length, of the locking-strip detached.

Referring to the drawing, 5 and 6 may designate the meeting end portions of two rails of a railway track; and 7 each of a pair of angle-bars or fish-plates of that well-known type, now standard with many railroads, which is formed with a grooved or channeled base conforming to and snugly fitting the rail-base on each side.

8 represents the usual fastening bolts passed through registering holes in the sides of the fish-plates and web of the rails and having the polygonal heads 9 and nuts 10. In some rail-joint fastenings the bolts are so disposed that the heads all lie on one side and the nuts on the other; while in others, as herein shown, adjacent bolts are inserted from opposite sides. This latter is the more modern practice, and hence I have selected the same for purposes of illustrating my invention.

Referring now to the device wherein my invention is more particularly embodied, 11 designates a locking-strip or bar, preferably of metal, of a length to span the entire series of bolts and, when in operative position, lying against the flat portions of the edges of the nuts and heads. The locking-strip is preferably positioned between the lower sides or edges of the nuts and bolt-heads and the upper side of the base of the fish-plate, as shown; and in such position obviously locks the nuts and bolt-heads engaged thereby against turning movement. The locking-strip, where made in quantities to fit uniform or standard joint-fastenings, will preferably have its ends up-turned, as at 12 and 13, to engage the outer sides or edges of the extreme end nuts or heads, which effectively prevents any endlong displacement of the locking-strip. To secure the locking-strip in place it is provided with a laterally projecting and depending extension 14 in the nature of a clip designed to embrace the base of the fish-plate, its extreme inner end being up-turned, as shown at 15, for engagement with the inner edge of the base of the fish-plate beneath the rail-base. This clip is of elastic or resilient metal, being either integral with the strip 11 or fastened thereto; and it is the more readily snapped into and out of place by forming in the lower horizontal limb thereof a shallow loop or bend 16.

Where the fastening bolts are so disposed that the nuts all lie on one side of the rail-joint, a single nut-lock on that side will suffice. Where adjacent bolts are inversely disposed, as herein illustrated, the nut-lock is applied on both sides, as shown; and in such case both the bolts and nuts are restrained against back-turning.

I claim—

1. The combination with the meeting ends of a pair of rails, a fish-plate having a grooved base embracing the bases of the rail ends, and fastening-bolts, of a locking-strip underlying the nuts or heads of said bolts and having an elastic laterally projecting clip embracing the base of said fish-plate, and terminating in an upwardly turned end adapted to be sprung into engagement with the inner edge of said fish-plate base, substantially as described.

2. The combination with the meeting ends of a pair of rails, a pair of fish-plates having grooved bases embracing the bases of the rail-ends, and fastening-bolts, of a pair of locking-strips underlying the heads and nuts of said bolts on either side of the rail-joint, respectively, each of said strips having an elastic lateral clip-like projection embracing the base of the fish-plate, the lower member of said projection having a shallow loop or bend and terminating in an upwardly turned end engaging the inner edge of said fish-plate base, substantially as described.

CHARLES F. CLAWSON.

Witnesses:
 ADAM WEIR,
 MYRTLE B. KINNEY.